(12) United States Patent
Fukada et al.

(10) Patent No.: US 11,426,982 B2
(45) Date of Patent: Aug. 30, 2022

(54) DISPLAY PANEL AND METHOD OF MANUFACTURING THE SAME

(71) Applicants: NISSHA CO., LTD., Kyoto (JP); SUN PACK CORPORATION, Tokyo (JP)

(72) Inventors: Yasuhide Fukada, Kyoto (JP); Hiroyasu Shigeta, Kyoto (JP); Tetsuya Ito, Sumida-ku (JP)

(73) Assignees: NISSHA CO., LTD., Kyoto (JP); SUN PACK CORPORATION, Tokyo (JP)

( * ) Notice: Subject to any disclaimer, the term of this patent is extended or adjusted under 35 U.S.C. 154(b) by 225 days.

(21) Appl. No.: 17/042,335

(22) PCT Filed: Mar. 28, 2019

(86) PCT No.: PCT/JP2019/013617
§ 371 (c)(1),
(2) Date: Sep. 28, 2020

(87) PCT Pub. No.: WO2019/189581
PCT Pub. Date: Oct. 3, 2019

(65) Prior Publication Data
US 2021/0023824 A1 Jan. 28, 2021

(30) Foreign Application Priority Data

Mar. 29, 2018 (JP) .............................. JP2018-063521

(51) Int. Cl.
*B32B 17/10* (2006.01)
*B32B 7/12* (2006.01)
*B32B 27/20* (2006.01)

(52) U.S. Cl.
CPC .......... *B32B 17/10807* (2013.01); *B32B 7/12* (2013.01); *B32B 17/1033* (2013.01);
(Continued)

(58) Field of Classification Search
CPC . B32B 17/10807; B32B 7/12; B32B 17/1033; B32B 17/10651; B32B 27/20;
(Continued)

(56) References Cited

U.S. PATENT DOCUMENTS

2021/0023824 A1\* 1/2021 Fukada ............. B32B 17/10807

FOREIGN PATENT DOCUMENTS

| JP | 2004001389 A | 1/2004 |
| JP | 2009096380 A | 5/2009 |

(Continued)

*Primary Examiner* — Betelhem Shewareged
(74) *Attorney, Agent, or Firm* — Alleman Hall Creasman & Tuttle LLP

(57) ABSTRACT

An object of the present disclosure is to provide a laminate panel in which a transparent colored layer is formed with a decorative sheet on a base substrate such as a resin plate or glass; and a display panel using the laminate panel and to provide a method of manufacturing the display panel.
The laminate panel includes a base substrate formed of a resin plate or glass plate, an adhesive layer formed on the base substrate, a transparent colored layer formed on the adhesive layer, and a surface protection layer formed on the transparent colored layer. The display panel is applied, for example, as an in-vehicle display panel.

19 Claims, 6 Drawing Sheets

(52) U.S. Cl.
CPC ........ *B32B 17/10651* (2013.01); *B32B 27/20* (2013.01); *B32B 2307/4026* (2013.01); *B32B 2307/412* (2013.01); *B32B 2307/538* (2013.01)

(58) Field of Classification Search
CPC ...... B32B 2307/4026; B32B 2307/412; B32B 2307/538
USPC .......................................................... 156/60
See application file for complete search history.

(56) References Cited

FOREIGN PATENT DOCUMENTS

| | | | |
|---|---|---|---|
| WO | 2014034850 A1 | 3/2014 | |
| WO | WO-2014034850 A1 * | 3/2014 | ............. B32B 27/08 |

* cited by examiner

DISPLAY PANEL AND METHOD OF MANUFACTURING THE SAME

CROSS REFERENCES TO RELATED APPLICATIONS

This application is a U.S. national phase of International Application No. PCT/JP2019/013617, filed on Mar. 28, 2019, which claims priority to Japanese Patent Application 2018-063521, filed on Mar. 29, 2018, each of which is incorporated herein by reference.

TECHNICAL FIELD

The present disclosure relates to a display panel including a transparent colored layer and a method of manufacturing the same.

BACKGROUND

A display panel for displaying information is used in an in-vehicle navigation system, a mobile terminal, or the like. The display panel is configured with a display region having excellent translucency and a non-display region preventing light leakage from a display device such as a liquid crystal panel in a required range. In the display panel, a colored display region may be provided from the perspective of the design of the display device when not lighting up. For example, JP2009-96380A (Patent Document 1) discloses a display panel including a display region formed of a smoke colored resin.

CITATION LIST

Patent Literature

Patent Document 1: JP2009-96380A

SUMMARY

Problems to be Solved by the Present Disclosure

In the known display panel as described above, a display panel is formed of a resin base substrate colored by kneading the resin base substrate with a pigment. Therefore, in order to manufacture display panels of various colors, it is necessary to prepare resin base substrates colored to the corresponding colors. Since the manufacturing method requires a production, for example, by using three tons or more of colored resin at a time, it is difficult to adopt a model of small-lot production. In addition, since display panels made of a transparent resin are produced by the same device, a large amount of transparent resin needs to flow to clean the device at the time of replacing resins, the model to be adopted is limited. Furthermore, in a case where colored glass is used as a display panel, for example, a colorant is added to a raw material of glass and melted at high temperature to manufacture the display panel. Alternatively, a display panel is manufactured in which a transparent colored layer is formed on the surface of transparent glass with a multilayer film of a metal oxide film. In the former case, the manufacturing method has the same constraint as a display panel made of a transparent colored resin, which may cause difficulty in small-lot production.

In the latter case, an expensive multilayer film is individually formed on the transparent glass finished into a finished product shape, and thus the design may have a constraint. For example, the manufacturing cost is high, and there are non-reproducible colors.

The present disclosure is made to solve the foregoing problems, and an object of the present disclosure is to provide: a display panel in which a decorative layer serving as a non-display region is formed on a laminate panel obtained by forming a transparent colored layer on a base substrate of a resin plate or glass with a decorative sheet including a transparent colored layer where the color, the optical characteristics, and the coating film surface state thereof are previously controlled with high accuracy, and a method of manufacturing the display panel.

Features for Solving the Problems

A first invention is a decorative sheet including: a base sheet; and a transparent colored layer formed on the base sheet, the transparent colored layer including a transparent resin and a pigment or dye and having a diffuse transmittance from 0.2 to 1.13%, a haze from 0.1 to 3%, and a thickness from 0.5 to 20 μm. A total light transmittance from the base sheet to the transparent colored layer, which is measured from the base sheet, is from 45 to 90%.

With such a configuration, in a case where the decorative sheet is used in manufacture of a display panel, the display panel can be manufactured, the display panel preventing characters and images of a display portion from being distorted or preventing the display portion from getting cloudy.

A second invention is the decorative sheet according to the first invention, wherein the pigment is a black pigment having an average particle diameter from 1 to 30 nm.

With such a configuration, the transparent colored layer is bluish black, and a black transparent colored layer is obtained that looks luxurious as compared with a reddish or yellowish transparent colored layer in which a typical black pigment having a large average particle diameter is used as a black pigment.

A third invention is the decorative sheet according to the first invention, wherein the pigment is a black pigment having an average particle diameter of 50 to 180 nm, and the transparent colored layer further comprises a toning pigment having an average particle diameter that is from 0.8 to 1.2 times as large as the average particle diameter of the black pigment.

With such a configuration, even when a black pigment having an average particle diameter from 50 to 180 nm and likely to become reddish or yellowish black is used, a toning pigment aligned with the average particle diameter of the black pigment is used in order to tone the color to bluish black or neutral black. Thus, the transparent colored layer, the haze of which is inhibited from increasing, is obtained.

A fourth invention is the decorative sheet according to any one of the first to third inventions further comprising a surface protection layer between the base sheet and the transparent colored layer.

With such a configuration, in a case where transfer is performed by peeling the base sheet with the decorative sheet and thereby a laminate panel or display panel is manufactured, the surface of the laminate panel or display panel can be protected by the surface protection layer.

A fifth invention is a method of manufacturing a laminate panel, the method including: forming a high peeling strength release film via an adhesive layer on a surface of the transparent colored layer of the decorative sheet described in any one of the first to third inventions; and peeling the high peeling strength release film, laminating a surface of the adhesive layer of the decorative sheet on the base substrate to fix the decorative sheet to the base substrate, and obtaining the laminate panel having a total light transmittance from 40 to 90% from the base sheet to the base substrate, which is measured from the base sheet.

With such a configuration, the transparent colored layer is formed on the base substrate with the decorative sheet including the transparent colored layer where the optical characteristics and color thereof are previously controlled with high accuracy. Therefore, for example, the decorative sheet including the transparent colored layer conforming to the desired design is individually prepared, and thereby the laminate panel including a freely selectable color or a freely selectable total light transmittance can be easily manufactured.

A sixth invention is a method of manufacturing a laminate panel, the method including: preparing the decorative sheet described in any one of the first to third inventions; forming a dam on a base substrate; forming an adhesive layer on the dam; and pressing a surface of the transparent colored layer of the decorative sheet against the adhesive layer to fix the decorative sheet to the base substrate, and obtaining the laminate panel having a total light transmittance from 40 to 90% from the base sheet to the base substrate, which is measured from the base sheet.

With such a configuration, the liquid adhesive layer having a low viscosity is formed on the inside of the dam on the base substrate. Accordingly, the decorative sheet is laminated on the adhesive layer, and thereby the base substrate and the decorative sheet are integrated via the adhesive layer that has a high storage elastic modulus after curing. Thus, the laminate panel can be manufactured.

A seventh invention is a method of manufacturing a laminate panel, the method including: forming a high peeling strength release film via an adhesive layer on a surface of the transparent colored layer of the decorative sheet described in the fourth invention; peeling the high peeling strength release film and laminating a surface of the adhesive layer of the decorative sheet on the base substrate to fix the decorative sheet to the base substrate; and peeling the base sheet and obtaining the laminate panel having a total light transmittance of 40 to 90% from the surface protection layer to the base substrate, which is measured from the surface protection layer.

With such a configuration, the transparent colored layer is transferred onto the base substrate with the decorative sheet including the transparent colored layer where the optical characteristics and color thereof are previously controlled with high accuracy. Therefore, for example, the decorative sheet including the transparent colored layer conforming to the desired design is individually prepared, and thereby the laminate panel including a freely selectable color or a freely selectable total light transmittance can be easily manufactured.

An eighth invention is a method of manufacturing a laminate panel, the method including: preparing the decorative sheet described in the fourth invention; forming a dam on a base substrate;

forming an adhesive layer on the dam; pressing a surface of the transparent colored layer of the decorative sheet against the adhesive layer to fix the decorative sheet to the base substrate; and peeling the base sheet and obtaining the laminate panel having a total light transmittance from 40 to 90% from the surface protection layer to the base substrate, which is measured from the surface protection layer.

With such a configuration, the liquid adhesive layer having a low viscosity is formed on the inside of the dam on the base substrate. Accordingly, the decorative sheet is laminated on the adhesive layer, and thereby the base substrate and the decorative sheet are integrated via the adhesive layer that has a high storage elastic modulus after curing. Thus, the laminate panel can be manufactured.

A ninth invention is a method of manufacturing a display panel, the method including: preparing the laminate panel manufactured by the method described in any one of the fifth to eighth inventions; and forming a decorative layer, which includes a transparent resin and a pigment, as a non-display region in a freely selectable location on the base sheet or the surface protection layer such that a total light transmittance in the non-display region, which is measured from the opposite side to the base substrate, is from 0 to 10% and that a color difference $\Delta E$ between the non-display region and a display region adjacent to the non-display region is from 0.1 to 1.0%.

With such a configuration, the non-display region is formed by the decorative layer, to a level at which when a display device is turned off, only a slight difference in color between the display region and the non-display region is visually perceived. Therefore, when the display device is turned off, the display region and the non-display region have a heightened sense of unity in color, and the display panel including such display region and non-display region can be manufactured.

A tenth invention is a laminate panel including: a base substrate; and the decorative sheet described in the first invention, in which a surface of the transparent colored layer is laminated on the base substrate. A total light transmittance from the base sheet to the base substrate, which is measured from the base sheet, is from 40 to 90%.

With such a configuration, in a case where the laminate panel is applied as a display panel, the display panel can be manufactured, the display panel preventing characters and images of a display portion from being distorted or preventing the display portion from becoming cloudy.

An eleventh invention is a laminate panel including: a base substrate; and the decorative sheet described in the second invention, from which the base sheet is peeled and in which a surface of the transparent colored layer is laminated on the base substrate. A total light transmittance from the surface protection layer to the base substrate, which is measured from the surface protection layer is from 40 to 90%.

With such a configuration, in a case where the laminate panel is applied as a display panel, the display panel can be manufactured, the display panel preventing characters and images of a display portion from being distorted or preventing the display portion from getting cloudy.

A twelfth invention is the laminate panel according to the tenth or eleventh invention, wherein the pigment is a black pigment having an average particle diameter from 1 to 30 nm.

With such a configuration, the transparent colored layer is bluish black, and a black transparent colored layer is obtained that looks luxurious as compared with a reddish or yellowish transparent colored layer in which a typical black pigment having a large average particle diameter is used as a black pigment.

A thirteenth invention is the laminate panel according to the tenth or eleventh invention, wherein the pigment is a black pigment having an average particle diameter from 50 to 180 nm, and the transparent colored layer further comprises a toning pigment having an average particle diameter that is from 0.8 to 1.2 times as large as the average particle diameter of the black pigment.

With such a configuration, even when a black pigment having an average particle diameter from 50 to 180 nm and likely to become reddish or yellowish black is used, a toning pigment aligned with the average particle diameter of the black pigment is used in order to tone the color to bluish black or neutral black. Thus, the transparent colored layer, the haze of which is inhibited from increasing, is obtained.

A fourteenth invention is the laminate panel according to the twelfth or thirteenth invention, wherein the surface protection layer or the base sheet has a surface roughness Ra from 0.1 nm to 100 nm, which is measured in accordance with JIS C2151.

With such a configuration, the unevenness of the surface of the laminate panel is small, and the entire surface thereof has uniform total light transmittance. Therefore, the laminate panel, the surface glare of which is inhibited, is obtained.

A fifteenth invention is a display panel including: a decorative layer including a transparent resin and a pigment and formed as a non-display region in a freely selectable location on the base sheet or the surface protection layer of the laminate panel described in any one of the tenth to fourteenth inventions. A total light transmittance in the non-display region, which is measured from the decorative layer, is from 0 to 10%, and a color difference ΔE between the non-display region and a display region adjacent to the non-display region is from 0.1 to 1.0%.

With such a configuration, when the display device is turned off, only a slight difference in color between the display region and the non-display region adjacent to display region is visually perceived. Therefore, to such a level, the display panel in which the display region and the non-display region have a heightened sense of unity can be obtained.

A sixteenth invention is a decorative sheet including: a base sheet; a release layer formed on the base sheet; a surface protection layer formed on the release layer; a transparent colored layer formed on the surface protection layer, the transparent colored layer including a transparent resin and a pigment and having a surface roughness Ra from 0.1 nm to 100 nm, which is measured in accordance with JIS C2151; an adhesive layer formed on the transparent colored layer; and a high peeling strength release film formed on the adhesive layer. A total light transmittance from the base sheet to the transparent colored layer is from 45 to 90%, and a peeling strength between the release layer and the surface protection layer is set to be greater than a peeling strength between the high peeling strength release film and the adhesive layer.

With such a configuration, the high peeling strength release film of the decorative sheet is previously peeled, and the adhesive layer is fixed on the base substrate. Thereafter, the base sheet can be peeled, and the transparent colored layer can be transferred. Therefore, at the time of manufacturing the laminate panel including the transparent colored layer, the laminate panel can be manufactured in a simpler step without a plurality of steps of previously fixing the adhesive layer on the base substrate and thereafter transferring the transparent colored layer.

A seventeenth invention is the decorative sheet according to the sixteenth invention, wherein the peeling strength between the release layer and the surface protection layer is from 0.15 to 0.50 N/25 mm, and the peeling strength between the high peeling strength release film and the adhesive layer is from 0.05 N to 0.30 N/25 mm.

With such a configuration, at the time of peeling the high peeling strength release film from the adhesive layer in the step of fixing and transferring the decorative sheet onto the base substrate, the decorative sheet excellent in peeling balance can be configured, by which the release layer and the surface protection layer that are formed on the base sheet do not previously peel off. As a result, productivity is improved.

An eighteenth invention is a method of manufacturing a laminate panel, the method including: preparing the decorative sheet described in the sixteenth or seventeenth invention; peeling the high peeling strength release film and fixing a surface of the adhesive layer of the decorative sheet on a base substrate; and peeling the base sheet and the release layer from the decorative sheet and transferring the transparent colored layer and the surface protection layer onto the base substrate.

With such a configuration, the transparent colored layer is formed on the base substrate with the decorative sheet including the transparent colored layer where the optical characteristics and color thereof are previously controlled with high accuracy. Therefore, for example, the decorative sheet including the transparent colored layer conforming to the desired design is individually prepared, and thereby the laminate panel including a freely selectable color or a freely selectable total light transmittance can be easily manufactured.

A nineteenth invention is a method of manufacturing a display panel, the method including: preparing the laminate panel manufactured by the method described in the eighteenth invention; and forming a decorative layer, which includes a transparent resin and a pigment, as a non-display region in a freely selectable location on the surface protection layer or the base sheet such that a total light transmittance in the non-display region, which is measured from the opposite side to the base substrate, is from 0 to 10% and that a color difference ΔE between the non-display region and a display region adjacent to the non-display region is from 0.1 to 1.0%.

With such a configuration, the non-display region is formed by the decorative layer to the level at which when the display device is turned off, only a slight difference in color between the display region and the non-display region is visually perceived. Therefore, when the display device is turned off, the display region and the non-display region have a heightened sense of unity in color, and the display panel including such display region and non-display region can be manufactured.

Advantageous Effects of Disclosure

According to the present disclosure, a laminate panel in which a base substrate is decorated with a transparent colored layer; and a display panel in which a display region and a non-display region are formed on a laminate panel can be obtained.

DETAILED DESCRIPTION

Next, embodiments of the invention will be described with reference to the drawings.

Figure 1A:
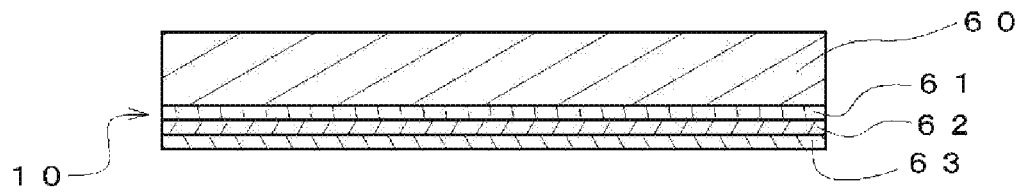
FIGS. 1(a) and (c) are cross-sectional views of a laminate panel according to an embodiment of the present disclosure, and FIGS. 1(b) and (d) are cross-sectional views of a display panel according to an embodiment of the present disclosure.

Referring to FIG. 1(a), a laminate panel 10 according to a first embodiment of the present disclosure includes: a base substrate 60, an adhesive layer 61 formed on the base substrate 60, a transparent colored layer 62 formed on the adhesive layer 61, and a surface protection layer 63 formed on the transparent colored layer 62. Further, the total light transmittance measured from the surface protection layer 63 of the laminate panel 10 is preferably from 40 to 90%, and more preferably from 40 to 85%. Here, the total light transmittance measured from the surface protection layer 63 means the total light transmittance of the entire laminate panel 10 including the surface protection layer 63, the transparent colored layer 62, the adhesive layer 61, and the base substrate 60. Further, a decorative layer 64 is formed as a non-display region 86, and thereby the laminate panel 10 is applied, for example, as an in-vehicle display panel.

Figure 1B:
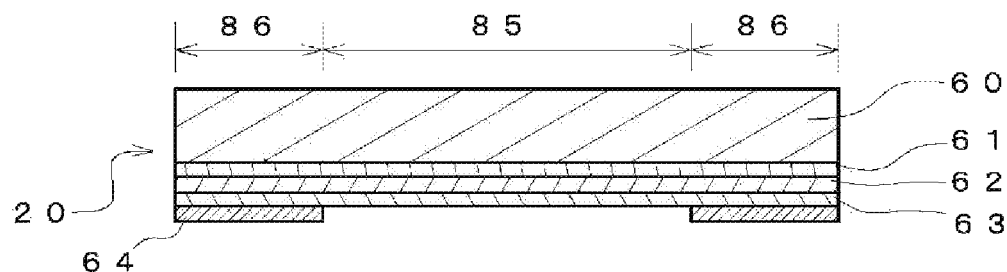
Figure 1C:
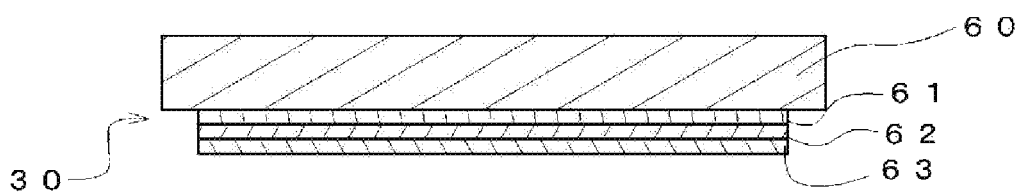
Figure 1D:
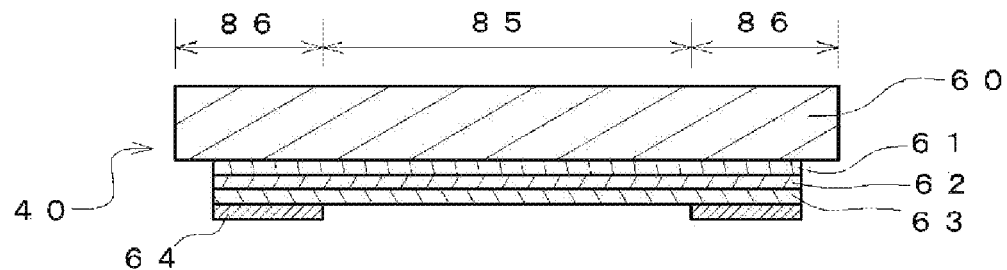

Referring to FIG. 1(b), a display panel 20 according to a second embodiment of the present disclosure includes: the non-display region 86 obtained by forming the decorative layer 64 on the surface protection layer 63 of the laminate panel 10 illustrated in FIG. 1(a); and a display region 85 disposed adjacent to the non-display region 86. Furthermore, the total light transmittance in the display region 85 of the display panel 20, which is measured from the surface protection layer 63 is preferably from 40 to 90% and more preferably from 40 to 85%.

For example, a resin plate such as polycarbonate or acrylic resin; or a glass plate can be used as the base substrate 60. The shape of the base substrate 60 in planar view may include, for example, a rectangular shape, a rectangular shape having four round-shaped corners, and a circular shape. In the case of a resin plate, the thickness of the base substrate 60 is preferably 1.0 mm or greater and 3.0 mm or less. In a case where the thickness of the base substrate 60 is less than 1.0 mm, the base substrate 60 lacks rigidity as a display panel, and thus may be succumbed to stress and deformed when touch input is performed. Meanwhile, in a case where the thickness of the base substrate 60 exceeds 3.0 mm, a module component including the display panel is too large in thickness. In addition, a hard coat layer may be formed on the surface of the base substrate 60, which serves as a surface layer when the base substrate becomes a final-end product.

On the other hand, in the case of a glass plate, the thickness is preferably from 0.5 to 2.0 mm. In a case where the thickness is less than 0.4 mm, the strength is insufficient, and when used as an in-vehicle module device, the plate may receive an impact such as a collision and break. In a case where the thickness exceeds 3.0 mm, the material costs rise.

The adhesive layer 61 serves to make the base substrate 60 and the transparent colored layer 62 firmly adhered. For example, an adhesive layer 67 can be used as the adhesive layer 61. More specifically, the adhesive layer is formed of an adhesive only and is a coreless tape not having a base substrate, a so-called Optical Clear Adhesive (OCA).

For example, an acrylic-based adhesive, a urethane-based adhesive, a silicone-based adhesive, a rubber-based adhesive, or a polyether-based adhesive can be applied as the adhesive.

Further, for example, a photocurable resin, specifically, an ultraviolet light curing resin 69, and more specifically, urethane acrylate, epoxy acrylate, or silicone acrylate can be used as the adhesive layer 61. In particular, in a case where the transparent colored layer 62 has a defect of partially peeling off from the base substrate 60 by outgas generated from the base substrate 60 at high temperature, an ultraviolet light curing resin 69 or another resin having a sufficiently high storage elastic modulus after curing is used. Therefore, the transparent colored layer 62 can be prevented from peeling off from the base substrate 60.

The transparent colored layer 62 serves to decorate the base substrate 60. A pigment is desirably dispersed into a transparent resin so that the total light transmittance is from 45 to 90% when the transparent colored layer 62 is included in a decorative sheet 70. The total light transmittance of the decorative sheet 70 including the transparent colored layer 62 is within this range. Accordingly, when the laminate panel 10 or the display panel 20 is formed, a portion of the light transmitted through the transparent colored layer 62 is absorbed by the base substrate 60 having a total light transmittance from 90 to 91%. As a result, the obtained laminate panel 10 includes a display region such that the total light transmittance in the display region 85 of the laminate panel 10 or the display panel 20 is a total light transmittance from 40 to 90%, which is suitable as a display function.

Note that the total light transmittance in the display region 85 of the laminate panel 10 or the display panel 20 refers to the total light transmittance measured from the surface protection layer 63. For example, a polyvinyl resin, a polyamide resin, a polyester resin, an acrylic resin, a polyurethane resin, a polyvinyl acetal resin, a polyester urethane resin, a cellulose ester resin, and an alkyd resin can be used as the transparent resin. The thickness of the transparent colored layer 62 is preferably, for example, 0.5 μm or greater and 10 μm or smaller. In a case where the thickness of the transparent colored layer 62 is less than 0.5 μm, the particle diameter of the pigment is large to the thickness of the coating film. Therefore, the pigment component may protrude from the surface of the coating film, and thus the pigment component cannot be sufficiently retained in the coating film of the transparent colored layer. As a result, the pigment component may peel off, for example, by adhesion of cellophane adhesive tape. Meanwhile, in a case where the thickness of the transparent colored layer 62 exceeds 10 μm, the variation in thickness of the coating film increases. Therefore, the variation in transmittance increases, and the transmittance does not fall within the range of the total light transmittance that is the required specification.

In transferring the transparent colored layer 62 with the decorative sheet 70, the surface protection layer 63 serves as a layer to protect the surface after transfer. In addition, the surface protection layer functions to smoothly peel a printed layer including the transparent colored layer 62 from a base sheet 71. For example, a melamine resin, an acrylic resin, a urethane resin, and an epoxy resin can be used as the surface protection layer 63. The thickness of the surface protection layer 63 is preferably, for example, from 1.0 μm to 5.0 μm or smaller. In a case where the surface protection layer 63 is less than 1.0 μm, the peeling strength is high, which causes poor transfer or which leads to lack of protective function of the surface. Meanwhile, in a case where the surface protection layer 63 exceeds 10 μm, the peeling strength is low, which allows the printed surface protection layer or transparent colored layer to perform blocking or which causes burrs during transfer processing and causes debris to be carried into a transfer step.

Additionally, the surface of the surface protection layer 63 preferably has a surface roughness Ra of 0.1 nm to 100 nm, which is measured in accordance with JIS C2151. In particular, due to the surface state of the coating film of the transparent colored layer 62, when the surface roughness Ra of the surface protection layer 63 exceeds 100 nm, fine protruded portions with a thick color and fine recessed portions with a thin color are generated to be located adjacent to one another or alternately and entirely disposed on the surface of the surface protection layer 63 in the display region 85. Accordingly, the laminate panel 10 or the display panel 20 does not have a uniform total light transmittance. Therefore, for example, when used as the display panel 20 for a five to nine inch display device, problems in image quality, such as glaring of transparent display may occur.

The decorative layer 64 serves to form the non-display region 86 on the laminate panel 10 to form the display panel 20. The decorative layer 64 is formed of a printed layer obtained by dispersing a pigment in a transparent resin. The total light transmittance in the non-display region 86 is preferably 0 to 10%. In a case where the total light transmittance is within this range, light leakage from the non-display region 86 can be prevented. In addition, the display region 85 and the non-display region 86 formed by the decorative layer 64 preferably have the same type of color when the light source of the display device is off. The same type of color means that the color difference ΔE between the display region 85 and the non-display region 86 is from 0.1 to 1.0%. A spectrophotometer CM-2600d/CM-2500d, available from Konica Minolta is used to measure the color difference ΔE. The measurement sample is obtained by applying a black standard color tile, available from ROMIXCS Co., Ltd., via an adhesive CS9621 having a thickness of 25 μm, available from Nitto Denko Corporation, on the surface protection layer 63 in the display region 85 of the display panel 20 and pressure-deforming the display panel for 30 minutes under conditions at 50° C. and at 5 atm. Chromaticities in the display region 85 and the non-display region 86 of the sample are measured. Then, the color difference ΔE is determined from the measurement result of the chromaticities, and when the color difference ΔE is from 0.1 to 1.0%, it is determined that the display region 85 and the non-display region 86 have the same type of color.

For example, a material similar to that of the transparent colored layer 62 can be used as the transparent resin and the pigment. Alternatively, a material different from that of the transparent colored layer 62 can be used. Further, a black pigment such as carbon black is preferably used as the pigment. In a case where a black pigment is used as the pigment, the display region 85 and the non-display region 86 are likely to have the same type of color when the light source of the display device is off. Accordingly, when the light source of the display device is off, the uniformity of the display region 85 and the non-display region 86 can be improved.

The same type of color in such a case refers to the level at which only a slight difference in color is visually perceived in the display region and the non-display region, in a case where a person looks at the display panel when the light source of the display device is off.

The thickness of the decorative layer 64 is preferably, for example, 1.0 μm or greater and 10 μm or smaller. In a case where the thickness of the decorative layer 64 is less than 1.0 μm, a sufficient light-blocking effect cannot be ensured due to insufficient thickness. Meanwhile, in a case where the thickness of the decorative layer 64 exceeds 10 μm, the difference in level between the decorative layer and the display region is large; therefore, defects may occur. For example, bubbles are generated at the base portion of the decorative layer at the time of attaching the display device such as a liquid crystal display with an adhesive in the next step.

The ratio of the area occupied by the display region 85 in the display panel 20 is preferably from 30% to 90%. In a case where the ratio of the area occupied by the display region 85 is greater than 90%, that is, when the non-display region 86 is less than 10%, the area of the non-display region 86 is small. The entire surface of the display panel 20 is substantially the display region 85. As a result, it is difficult that the colors of the display region 85 and the non-display region 86 represent a sense of unity. In addition, it may be difficult to cover portions, such as wiring of a touch panel, which are not associated with the display. Meanwhile, in a case where the area occupied by the display region 85 is less than 30%, that is, when the non-display region 86 exceeds 70%, for example, the required area of the non-display region relative to the display region 85 of seven to nine inches is larger. Accordingly, the display panel 20 is designed to have a very large size as a whole. Therefore, the number of products taken from a laminate panel with a certain size is small, which may lead to a poor production efficiency.

Next, a method of manufacturing the decorative sheet 70 and the laminate panel 10 according to the first embodiment of the present disclosure will be described with reference to FIGS. 2 and 3.

Referring to FIG. 2(*a*), a release layer 72 is formed on the base sheet 71. Next, referring to FIG. 2(*b*), the surface protection layer 63 is formed on the release layer 72, and the transparent colored layer 62 is formed on the surface protection layer 63.

At this time, the transparent colored layer 62 is preferably formed in a forming step to have a surface roughness Ra from 0.1 nm to 100 nm, which is measured in accordance with JIS C2151.

When the surface roughness Ra exceeds 100 nm, fine protruded portions with a large film thickness and fine recessed portions with a small film thickness are generated to be located adjacent to one another or alternately and entirely disposed on the transparent colored layer 62. Therefore, the transparent colored layer 62 does not become a coating film having an entirely uniform thickness.

As a result, uneven shading occurs in the total light transmittance of the decorative sheet 70. Thus, when eventually used as a display panel for a five to nine inch display device, the quality of transparent display may deteriorate.

Figure 2A:
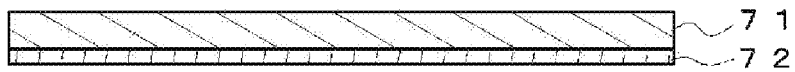
FIGS. 2(a) to (d) are schematic diagrams illustrating a manufacturing step of a decorative sheet used in manufacturing the display panel according to a first embodiment of the present disclosure.
Figure 2B:
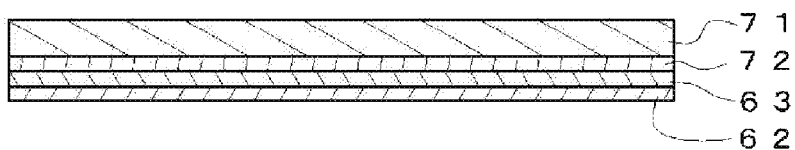
Figure 2C:
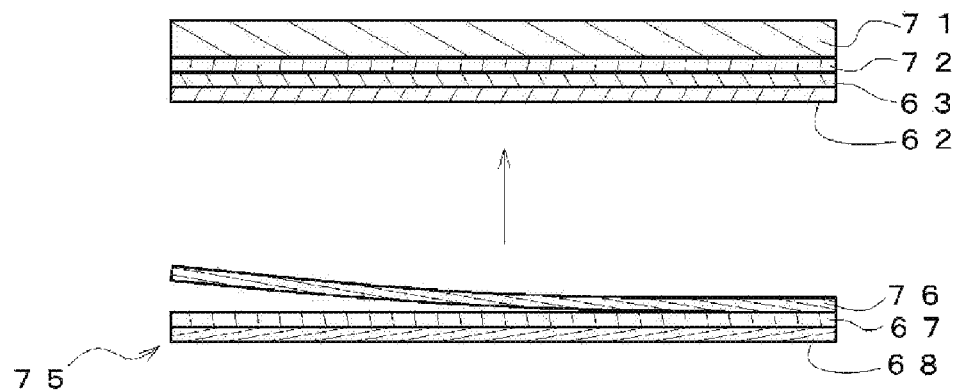
Figure 2D:
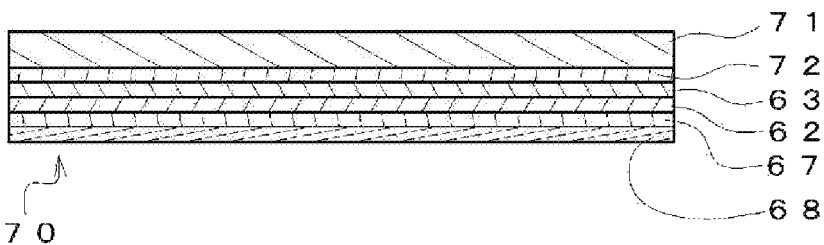

Next, referring to FIG. 2(c), the adhesive layer 67, on both sides of which a high peeling strength release film 68 and a low peeling strength release film 76 are formed thus constituting a double-sided adhesive sheet 75, is prepared. Next, the low peeling strength release film 76 of the double-sided adhesive sheet 75 is peeled and fixed on the transparent colored layer 62, which previously forms a surface opposed to the adhesive layer 67. Thus, the decorative sheet 70 illustrated in FIG. 2(d) is prepared.

The decorative sheet 70 obtained here includes the release layer 72 formed on the base sheet 71, the surface protection layer 63 formed on the release layer 72, the transparent colored layer 62 formed on the surface protection layer 63, the adhesive layer 67 as the adhesive layer 61 formed on the transparent colored layer 62, and the high peeling strength release film 68 formed on the adhesive layer 67. The display panel 20 according to a second embodiment described below can also be manufactured with the decorative sheet 70 in the same manner.

Next, the transfer step onto the base substrate 60 with the decorative sheet 70 will be described with reference to FIG. 3.

Figure 3A:
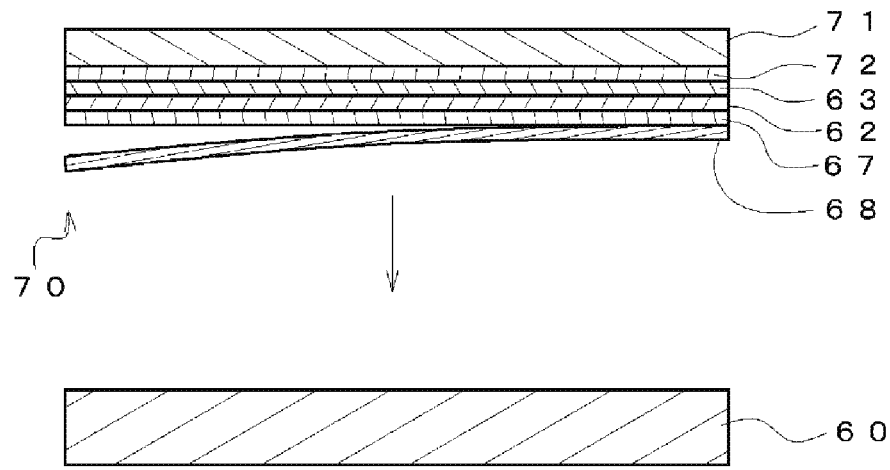
FIGS. 3(a) to (c) are schematic diagrams illustrating a manufacturing step of the display panel according to the first embodiment of the present disclosure.
Figure 3B:
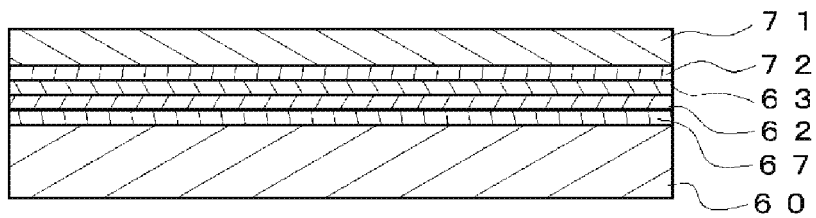
Figure 3C:
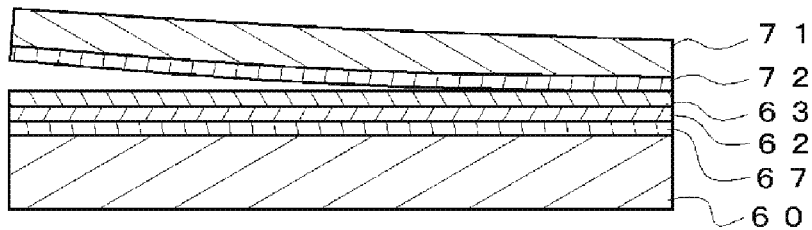

Referring to FIG. 3(a), the high peeling strength release film 68 of the decorative sheet 70 is peeled. Next, with reference to FIG. 3(b), the decorative sheet 70 is adhered to the base substrate 60 so that the adhesive layer 67 is fixed to the base substrate 60. Subsequently, referring to FIG. 3(c), the base sheet 71 is peeled together with the release layer 72 so that the surface protection layer 63 is exposed, and the adhesive layer 67, the transparent colored layer 62, and the surface protection layer 63 are transferred onto the base substrate 60. In this way, the laminate panel 10 illustrated in FIG. 1(a) is manufactured.

From the above, in the laminate panel 10 manufactured as described above, the transparent colored layer 62 is uniformly formed by transfer onto the base substrate to have the total light transmittance with minimized variation. Therefore, compared with a known transparent colored display panel, the laminate panel 10 has stable light transparency without being affected by the thickness of the base substrate.

The decorative sheet 70 is preferably designed such that the total light transmittance from the base sheet 71 to the transparent colored layer 62 is 45 to 90%. When the total light transmittance is within this range, light is partially absorbed by the base substrate 60 in the laminate panel 10 obtained by transfer onto the base substrate 60 with the decorative sheet 70, and thus the laminate panel 10 having the total light transmittance from 40 to 85% is obtained.

In addition, the peeling strength between the release layer 72 and the surface protection layer 63 is preferably from 0.15 to 0.50 N/25 mm, and the peeling strength between the high peeling strength release film 68 and the adhesive layer 67 is preferably from 0.07 to 0.10 N/25 mm. In other words, the release layer 72, the surface protection layer 63, the transparent colored layer 62, the adhesive layer 67, and the high peeling strength release film 68 are layered in this order on the base sheet 71. Preferably, the decorative sheet 70 is prepared in which the surface protection layer 63 is set such that the peeling strength to the release layer 72 is from 0.15 to 0.50 N/25 mm and the high peeling strength release film 68 is set such that the peeling strength to the adhesive layer 67 is from 0.05 to 0.30 N/25 mm. More preferably, the decorative sheet 70 is prepared in which the high peeling strength release film 68 is set such that the peeling strength to the adhesive layer 67 is from 0.07 to 0.10 N/25 mm.

With such a configuration, at the time of fixing the adhesive layer 67 of the decorative sheet 70 to the base substrate 60, peeling at the interface between the high peeling strength release film 68 and the adhesive layer 67 can be made without previous peeling off of the interface between the release layer 72 and the surface protection layer 63. Accordingly, the decorative sheet 70 previously integrated with the adhesive layer 67 can be fixed with the base sheet 71 attached. Therefore, when the transparent colored layer 62 is transferred onto the base substrate 60, the transfer processing can be performed without causing defects such as wrinkles, warping, and intrusion of air bubbles.

Measurement of the peeling strength is performed by using a TENSILON universal material testing machine RTC-1150A, available from A&D Company, Limited. The decorative sheet 70 and the double-sided adhesive sheet 75 each having a width of 100 mm and a length of 200 mm are used as a sample. In the event of measuring the peeling strength of the protecting sheet high peeling strength release film 68, the low peeling strength release film 76 is peeled from the adhesive layer 67, and the exposed adhesive layer 67 is adhered to a polycarbonate film to be used as a sample.

First, the sample is fixed to a low-speed elongation tester in a constant temperature and humidity test machine. Next, measurement is performed by peeling in 180 degrees direction at 300±30 mm/minute with respect to the peeling surface. This measurement is performed three times, and the average values are converted to the 25 mm width to be defined as the peeling strength.

The base sheet 71 is used as a support body for forming the transparent colored layer 62, the surface protection layer 63, and the adhesive layer 67 on the base substrate 60. For example, a resin sheet made of polyethylene terephthalate (PET), an acrylic resin, polycarbonate, or polyvinyl resin; or a cellulosic sheet such as glassine paper, coated paper, or cellophane can be used as the base sheet 71. The thickness of the base sheet 71 is preferably, for example, 50 µm or greater and 125 µm or smaller. When the thickness of the base sheet 71 is less than 50 µm, the decorative sheet 70 does not have elasticity. Therefore, wrinkles and warping are generated in a fixing step to the base substrate, and the transfer processing of the surface to which the transparent colored layer is transferred excellent in quality cannot be performed. Meanwhile, in a case where the thickness of the base sheet 71 exceeds 125 µm, the thickness is large and thus the initial peeling strength is low. As a result, at the time of peeling the high peeling strength release film 68 from the adhesive layer 67, the release layer 72 and the surface protection layer 63 may also partially peel off, which causes an issue for the fixing step.

The release layer 72 is used to stabilize the peeling strength of the base sheet 71 from the surface protection layer 63 at the time of transfer onto the base substrate 60 with the decorative sheet 70. The release layer 72 remains on the base sheet 71 after transfer. For example, a melamine-based resin, a silicone-based resin, a fluorine-based resin, an epoxy-based resin, a urea-based resin, a polyurethane-based resin, a polyester-based resin, or a phenol-based resin can be used as the release layer 72. The thickness of the release layer 72 is preferably, for example, 1.0 µm or greater and 5.0 µm or smaller. When the thickness of the release layer 72 is less than 1.0 µm, the coating surface is inadequately formed on the base sheet 71, and thus stable releasability cannot be ensured. Meanwhile, when the thickness of the release layer 72 exceeds 5.0 unreacted groups in the release layer 72 and components of the surface protection layer 63 and the adhesive layer 61 react, which may cause defects of increasing the peeling strength or causing the release layer 72 to be forcibly peeled from the base sheet 71.

The high peeling strength release film 68 and the low peeling strength release film 76 are films required at the time of forming the adhesive layer 67 by coating, and after an annealing process in a production step, the high peeling strength release film 68 and the low peeling strength release film 76 are stabilized with the adhesive layer 67 held by the films. Therefore, the double-sided adhesive can be obtained.

The high peeling strength release film 68 and the low peeling strength release film 76 may for example, mainly include polyethylene terephthalate (PET) with a thickness of 38 µm or greater and 75 µm or smaller as a base sheet, the base sheet having one surface on which a release layer formed of any one of resin layers of a melamine-based resin, a silicon-based resin, a fluorine-based resin, an epoxy-based resin, a urea-based resin, a polyurethane-based resin, a polyester-based resin, and a phenol-based resin made into a pigment is disposed. Any low peeling strength release film having peeling strength from 0.01 to 0.07 N/25 mm to the adhesive may be used, whereas any high peeling strength release film having a peeling strength from 0.05 to 0.30 N/25 mm to the adhesive may be used.

The films are set in these ranges, and thus, in the step of FIG. 2(c), the low peeling strength release film 76 is peeled with the adhesive layer 67 remaining on the high peeling strength release film 68, and the adhesive layer 67 can be laminated on the transparent colored layer 62.

When the ranges of the peeling strengths of the high peeling strength release film 68 and the low peeling strength release film 76 overlap, the peeling balance breaks. Therefore, the low peeling strength release film 76 cannot be smoothly peeled from the adhesive layer 67 with the high peeling strength release film 68 remaining.

The formation of each layer respectively on the base substrate 60 and the base sheet 71 may be performed by known layer forming methods. Examples of the known layer forming methods include: coating methods such as a gravure coating method, a roll coating method, and a comma coating method; printing methods such as a gravure printing method and a screen printing method; or laminate methods.

Next, a method of manufacturing the display panel 20 according to the second embodiment of the present invention disclosure will be described.

After manufacturing the laminate panel 10 according to the first embodiment, the decorative layer 64 is formed on a part of the surface protection layer 63, which is to be the non-display region 86, and thus the display panel 20 including, in a freely selectable part, the display region 85 and the non-display region 86 located adjacent to the display region 85 is manufactured as illustrated in FIG. 1(b).

From the above, the display panel 20 manufactured as described above includes: the display region 85 obtained by providing the adhesive layer 61, the transparent colored layer 62, and the surface protection layer 63 on the base substrate 60; and the non-display region 86 obtained by further providing into the configuration thereof the decorative layer 64 with a shielding property. Therefore, when being installed as an in-vehicle display panel, the display panel 20 with a heightened sense of unity can be obtained to the level at which when the light source of the display device is off, the display region 85 and the non-display region 86 have the same type of color and only a slight difference in color between the display region and the non-display region is visually perceived.

Next, the laminate panel 10 according to a third embodiment of the present disclosure and the display panel 20 according to a fourth embodiment of the present disclosure will be described mainly focused on the differences from the previous embodiments with reference to the drawings.

The laminate panel 10 according to the third embodiment of the present disclosure and the display panel 20 according to the fourth embodiment of the present disclosure are respectively the same in terms of configuration as the laminate panel 10 according to the first embodiment and the display panel 20 according to the second embodiment. On the other hand, the manufacturing method thereof differs from that of the first and second embodiments. In the manufacturing method according to the first and second embodiments, the adhesive layer 67 is used as the adhesive layer 61. Alternatively, in the manufacturing method of the laminate panel 10 according to the third embodiment and the display panel 20 according to the fourth embodiment, the ultraviolet light curing resin 69 is used as the adhesive layer 61. In addition, a dam 90, which includes vertical walls of a rectangular frame shape, is formed on the base substrate 60, and the laminate panel 10 and the display panel 20 are manufactured. The dam 90 is used to flatly fill the corners of the coating interface with the ultraviolet light curing resin 69 for adhering a decorative sheet 80 applied in the third embodiment and the fourth embodiment to the base substrate 60.

A method of manufacturing the laminate panel 10 according to the third embodiment of the present disclosure will be described with reference to FIGS. 4 and 5.

Figure 4A:
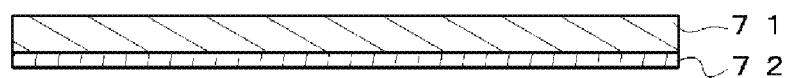
FIGS. 4(a) and (b) are schematic diagrams illustrating a manufacturing step of the decorative sheet used in manufacturing the display panel according to a third embodiment of the present disclosure.
Figure 4B:
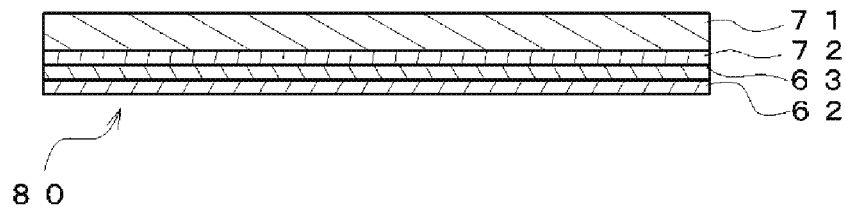

Referring to FIG. 4(a), the release layer 72 is formed on the base sheet 71. Next, referring to FIG. 4(b), the surface protection layer 63 is formed on the release layer 72, and the transparent colored layer 62 is formed on the surface protection layer 63, and thereby the decorative sheet 80 is prepared. Likewise, in the fourth embodiment described below, the display panel can be manufactured with the decorative sheet 80.

Next, the transfer step onto the base substrate 60 with the decorative sheet 80 will be described with reference to FIG. 5.

Figure 5A:
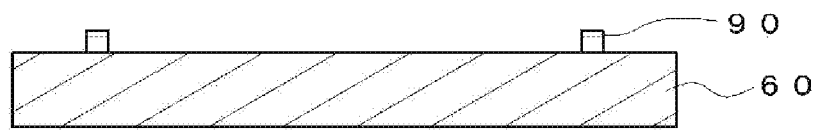
FIGS. 5(a) to (e) are schematic diagrams illustrating a manufacturing step of the display panel according to the third embodiment of the present disclosure.
Figure 5B:
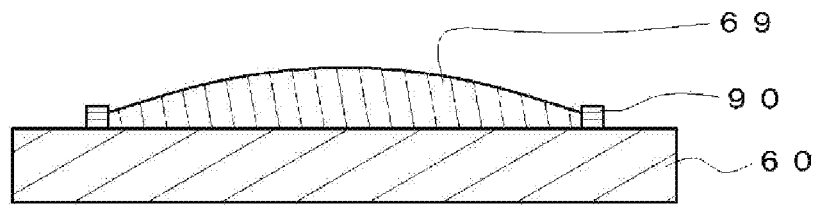
Figure 5C:
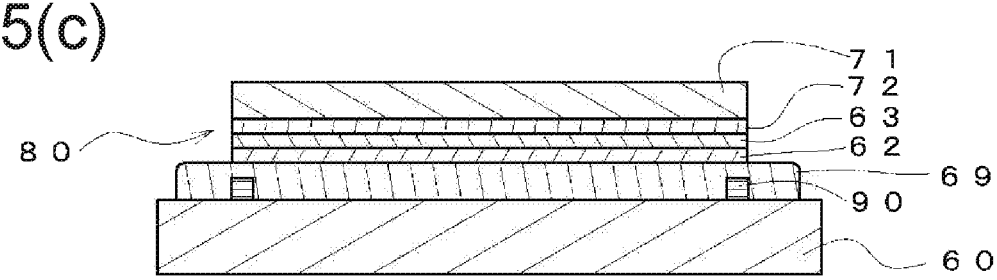
Figure 5D:
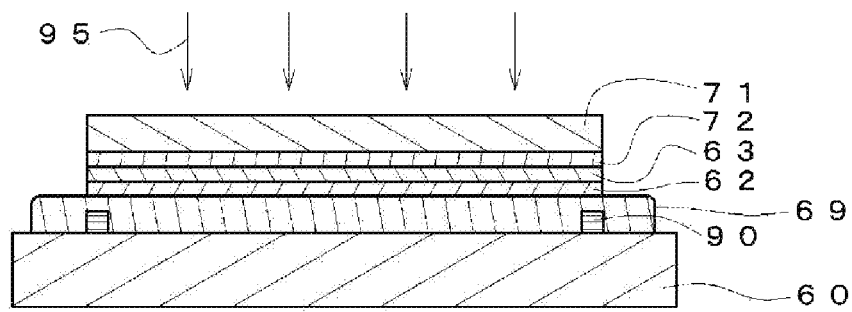
Figure 5E:
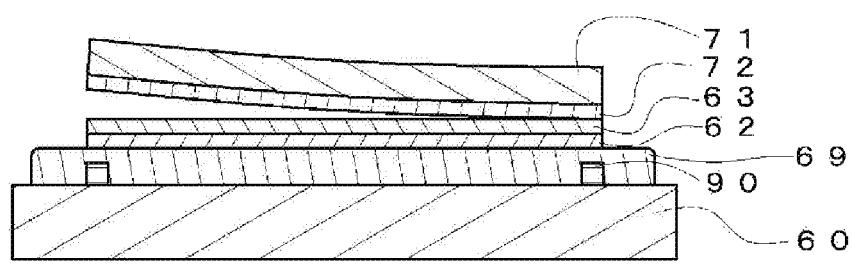
Figure 6A:
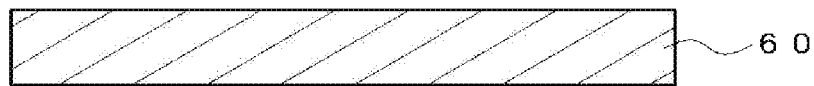
FIGS. 6(a) to (d) are schematic diagrams illustrating a manufacturing step of the display panel according to a fifth embodiment of the present disclosure.
Figure 6B:
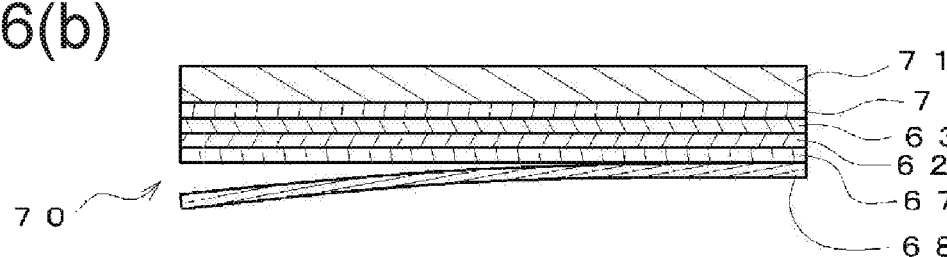
Figure 6C:
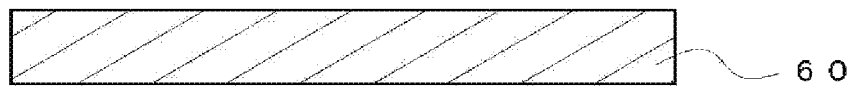
Figure 6D:
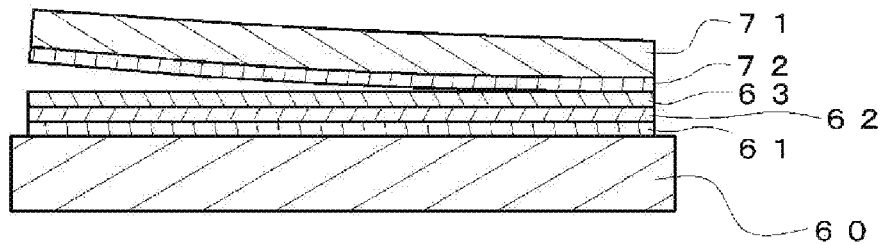

Referring to FIG. 5(a), the dam 90 is formed on the base substrate 60 with the vertical walls of a rectangular frame shape. Next, referring to FIG. 5(b), the ultraviolet light curing resin 69 is applied to the inner side of the dam 90 by a dispenser (not illustrated). The amount of the ultraviolet light curing resin 69 to be applied is the amount with which at least a portion of the ultraviolet light curing resin has a height exceeding the height of the vertical walls such that the ultraviolet light curing resin 69 on the inside of the dam 90 corresponds to a sufficient amount to overflow to the outside of the dam 90 in the after-mentioned step of firmly fixing the decorative sheet 80. Next, with reference to FIG. 5(c), the surface of the transparent colored layer 62 of the decorative sheet 80 is disposed in a stationary manner while being pressed against the ultraviolet light curing resin 69. At this time, the excess ultraviolet light curing resin 69 on the inside of the dam 90 overflows to the outside of the dam 90, and thus has a thickness uniform with the thickness of the interface between the base substrate 60 and the decorative sheet 80. Next, referring to FIG. 5(d), an ultraviolet light 95 is radiated to cure the ultraviolet light curing resin 69, and thus the decorative sheet 80 is fixed to the base substrate 60. Next, referring to FIG. 5(e), the base sheet 71 is peeled together with the release layer 72 so that the surface protection layer 63 is exposed, and the transparent colored layer 62 and the surface protection layer 63 are transferred onto the base substrate 60. Next, trimming is performed on the inside of the dam 90. In this way, the laminate panel 10 illustrated in FIG. 1(a) is manufactured.

From the above, in the laminate panel 10 manufactured as described above, the transparent colored layer 62 is uniformly formed by transfer onto the base substrate to have the total light transmittance with minimized variation. Therefore, compared with a known transparent colored display panel, the laminate panel 10 has stable light transparency without being affected by the thickness of the base substrate.

Further, in a case where a material such as a polycarbonate resin from which outgas is generated at high temperature is used as the base substrate 60, since the base substrate 60 and the transparent colored layer 62 are adhered by the ultraviolet light curing resin 69 which has high hardness and the hardness of which slightly changes even when the ambient temperature rises, the transparent colored layer 62 can be prevented from peeling off by formation of the outgas from the base substrate.

The decorative sheet 80 is preferably designed such that the total light transmittance from the base sheet 71 to the transparent colored layer 62 is 45 to 90%. When the total light transmittance is within this range, light is partially absorbed by the base substrate 60 in the laminate panel 10 obtained by transfer onto the base substrate 60 with the decorative sheet 80, and thus the laminate panel 10 having the total light transmittance from 40 to 85% is obtained.

In addition, the peeling strength between the release layer 72 and the surface protection layer 63 is preferably from 0.15 to 0.50 N/25 mm. With such a configuration, at the time of transferring the transparent colored layer 62 via the ultraviolet light curing resin 69 onto the base substrate 60, the base sheet 71 and the release layer 72 can be smoothly peeled from the surface protection layer 63.

For example, a photocurable resin formed of, for example, urethane acrylate, epoxy acrylate, or silicone acrylate can be used as the ultraviolet light curing resin 69. For other materials, the same materials as those of the first embodiment can be used. The ultraviolet light curing resin 69 after curing preferably has a durometer hardness of 55 to 80 of type D, which is measured at 25° C. in accordance with JIS K7215. When being within this range, the durometer hardness of the ultraviolet light curing resin 69 is the hardness with which unevenness is unlikely to be generated on the surface of the surface protection layer 63 of the laminate panel 10 and the display panel 20 when an external force is applied during secondary processing of the manufactured laminate panel 10 and the display panel 20 manufactured by using the laminate panel 10 or during process flow performed by laminating a protective film. Therefore, the occurrence of appearance defects can be prevented. On the other hand, when a display device or touch sensor is further mounted via an adhesive on the surface of the surface protection layer 63 by secondary processing, the uneven surface is filled with the adhesive and there occurs no problem. In such a case, the durometer hardness may be out of the range from 55 to 80.

The dam 90 can be performed by known layer forming methods. Examples of the known layer forming methods include: coating methods such as a gravure coating method, a roll coating method, and a comma coating method; printing methods such as a gravure printing method and a screen printing method; or laminate methods.

Next, a method of manufacturing the display panel 20 according to the fourth embodiment of the present disclosure will be described.

The display panel 20 illustrated in FIG. 1(*b*) includes, in a freely selectable part, the display region 85 and the non-display region 86 disposed adjacent to the display region 85. After manufacturing the laminate panel 10 according to the third embodiment, the decorative layer 64 is formed on a part of the surface protection layer 63, which is to be the non-display region 86. Thus, the display panel 20 illustrated in FIG. 1(*b*) is manufactured.

In addition, when needed, trimming may be further performed after forming the decorative layer 64.

In this case, the method of manufacturing the display panel 20 is a method of manufacturing the display panel 20, which further includes: a step of preparing the laminate panel 10, a step of performing trimming on the inside of the dam 90, and a step of performing trimming after the step of forming the decorative layer 64.

From the above, the display panel 20 manufactured as described above includes: the display region 85 obtained by providing the adhesive layer 61, the transparent colored layer 62, and the surface protection layer 63 on the base substrate 60; and the non-display region 86 obtained by further providing into the configuration thereof the decorative layer 63 with a shielding property. Therefore, when being installed as an in-vehicle display panel, the display panel 20 with a heightened sense of unity can be obtained to the level at which when the light source of the display device is off, the display region 85 and the non-display region 86 have the same type of color and only a slight difference in color between the display region and the non-display region is visually perceived.

Next, a laminate panel 30 according to a fifth embodiment of the present disclosure and a display panel 40 according to a sixth embodiment of the present disclosure will be described mainly focused on the differences from the previous embodiments with reference to the drawings.

Referring to FIGS. 1(*c*) and 1(*d*), the laminate panel 30 according to the fifth embodiment of the invention and the display panel 40 according to the sixth embodiment differ from the previous embodiments in that a glass sheet is used as the base substrate. On the other hand, the other configurations are respectively the same as the laminate panel 10 according to the first embodiment and the third embodiment and the display panel 20 according to the second embodiment and the fourth embodiment.

A method of manufacturing the laminate panel 30 according to the fifth embodiment of the present disclosure will be described with reference to FIG. 6.

Referring to FIG. 6(*a*), the glass sheet is cut, polished, and pressed, and thereby the base substrate 60 trimmed into a freely selectable shape is prepared. Next, the decorative sheet 70 having a size smaller by 0.05 to 0.1 mm on one side than the shape of the base substrate 60 is prepared. Next, referring to FIG. 6(*b*), the high peeling strength release film 68 of the decorative sheet 70 is peeled. Subsequently, referring FIG. 6(*c*), the decorative sheet 70 is adhered to the base substrate 60 so that the adhesive layer 67 is fixed to the base substrate 60. Next, referring to FIG. 6(*d*), the base sheet 71 is peeled together with the release layer 72 so that the surface protection layer 63 is exposed, and the adhesive layer 67, the transparent colored layer 62, and the surface protection layer 63 are transferred onto the base substrate 60. In this way, the laminate panel 30 in which the base substrate 60 illustrated in FIG. 1(*c*) is the glass sheet is manufactured.

From the above, in the laminate panel 30 manufactured as described above, the transparent colored layer 62 is uniformly formed by transfer onto the glass sheet base substrate to have the total light transmittance with minimized variation. Therefore, compared with a known transparent colored glass panel, the laminate panel 30 has stable light transparency without being affected by the thickness of the glass sheet base substrate.

For example, tempered glass, sapphire glass, zirconia glass, soda glass, or borosilicate glass can be used as the base substrate 60.

The adhesive layer 61 serves to make the base substrate 60 and the transparent colored layer 62 firmly adhered. The adhesive layer 61 is formed, for example, as the adhesive layer 67 only made of an adhesive and is a coreless tape not having a base substrate, so-called Optical Clear Adhesive (OCA).

For example, an acrylic-based adhesive, a urethane-based adhesive, a silicone-based adhesive, a rubber-based adhesive, or a polyether-based adhesive can be used as the adhesive 67.

Next, a method of manufacturing the display panel 40 according to the sixth embodiment of the present disclosure will be described.

In the display panel 40 illustrated in FIG. 1(*d*), with respect to the laminate panel 30 according to the fifth embodiment, the decorative layer 64 is formed on a part of the surface protection layer 63, which is to be the non-display region 86. Therefore, the display panel 40 including, in a freely selectable part, the display region 85 and the non-display region 86 disposed adjacent to the display region 85 is manufactured as illustrated in FIG. 1(*d*).

From the above, the display panel 40 manufactured as described above includes: the display region 85 obtained by providing the adhesive layer 61, the transparent colored layer 62, and the surface protection layer 63 on the base substrate 60; and the non-display region 86 obtained by further providing into the configuration thereof the decorative layer 63 with a shielding property. Therefore, when being installed as an in-vehicle display panel, the display panel 40 with a heightened sense of unity can be obtained to the level at which when the light source of the display device is off, the display region 85 and the non-display region 86 have the same type of color and only a slight difference in color between the display region and the non-display region is visually perceived.

Next, a laminate panel according to a seventh embodiment of the present disclosure and a display panel according to an eighth embodiment of the present disclosure will be described mainly focused on the differences from the previous embodiments.

The laminate panel according to the seventh embodiment of the present disclosure and the display panel according to the eighth embodiment differ in the configuration of the transparent colored layer 62. Specifically, the differences are in that the diffuse transmittance, haze, and thickness of the transparent colored layer 62 and the average particle diameter of the pigment used in the transparent colored layer 62 are adjusted. Furthermore, the difference is in that the transparent colored layer 62 has a color from bluish black to neutral black. Other configurations and the manufacturing method are the same as the laminate panel and the display panel according to the previous embodiments. Here, "bluish black" means that the chromaticity a* and the chromaticity b* are respectively 1 to −1 and 1 to −4 in the L*a*b* color space represented by the luminosity L*, the chromaticity a*, and the chromaticity b*.

The pigment is dispersed in the transparent resin, and thereby the transparent colored layer 62 is formed. For example, a black pigment having an average particle diameter from 1 to 30 nm can be used as the pigment. Meanwhile, a black pigment having an average particle diameter from 50 to 150 nm is commonly used. However, the black pigment having an average particle diameter from 50 to 150 nm has properties likely to absorb blue light and reflect red light, therefore having a reddish or yellowish undertone. A reddish or yellowish color is easily generated when the concentration of the pigment is reduced, in particular, in order to reduce haze. On the other hand, the display panel is desirably designed such that the transparent colored layer serving as a display portion is bluish black or neutral black. In this case, it is not easy to generate bluish black with a black pigment only, which has an average particle diameter from 50 to 150 nm. In the present embodiment, a black pigment likely to reflect blue light and having an average particle diameter from 1 to 30 nm is used, and thereby bluish black can be generated.

Here, the average particle diameter is measured by a laser diffraction/scattering type particle size distribution measurement device.

The diffuse transmittance of the transparent colored layer is preferably from 0.2 to 1.13%. When the diffuse transmittance is 1.13% or smaller, the haze of the transparent colored layer can be prevented from extremely increasing. The haze of the transparent colored layer is preferably from 0.1 to 3%. When the haze is 3% or smaller, a display panel on which an image is unlikely to be distorted is obtained. The total light transmittance of the transparent colored layer is preferably from 45 to 90% in the same manner as in the previous embodiments. The thickness of the transparent colored layer is preferably from 0.5 μm to 20 μm. In a case where the thickness of the transparent colored layer is less than 0.5 μm, the particle diameter of the pigment is large to the thickness of the coating film. Therefore, the pigment component may protrude from the surface of the coating film, and thus the pigment component cannot be sufficiently retained in the coating film of the transparent colored layer. As a result, the pigment component may peel off, for example, by adhesion of cellophane adhesive tape. Meanwhile, in a case where the thickness of the transparent colored layer exceeds 20 μm, the variation in thickness of the coating film increases; therefore, the variation in haze may increase.

Here, a spectrophotometer CM-5, available from Konica Minolta is used to measure the diffuse transmittance. A transparent colored layer is formed via OCA on a glass base substrate, which is applied as a measurement sample. The measurement sample is measured with a measurement mode set to a transparent measurement/haze opacity mode, a light source set to D65, an angle set to 2 degrees, and an attribute set to Black.

From the above, in the laminate panel and the display panel having the transparent colored layer as described above, the black pigment in the transparent colored layer has an average particle diameter from 1 to 30 nm and is likely to reflect blue light. Thus, the laminate panel 50 having a bluish black tone and the display panel 60 having a bluish display region are obtained.

Next, a laminate panel according to a ninth embodiment of the present disclosure and a display panel according to a tenth embodiment of the present disclosure will be described focused on the differences from the seventh embodiment and the eighth embodiment.

The laminate panel according to the eighth embodiment of the present disclosure and the display panel according to the ninth embodiment of the present disclosure differ in the configuration of the transparent colored layer 62. Specifically, the difference is in that the transparent colored layer 62 is colored with not a pigment but a dye. The other configurations including the diffuse transmittance, haze, thickness, and total light transmittance of the transparent colored layer and the manufacturing method are the same as the laminate panel 100 according to the sixth embodiment and the display panel 110 according to the seventh embodiment.

The dye is dispersed in the transparent resin, and thereby the transparent colored layer 62 is formed. For example, a black dye can be used as the dye. When a black dye is used for coloring the transparent colored layer 62, the dye becomes a bluish tone due to the small average particle diameter compared with the pigment. Thus, the black dye is used to color the transparent colored layer 62, and thereby the bluish transparent colored layer 62 is obtained.

From the above, since the black dye used to color the transparent colored layer has a bluish tone, the laminate panel and the display panel having the transparent colored layer as described above are formed as the laminate panel having a bluish black tone and the display panel having a bluish display region.

Next, a laminate panel according to an eleventh embodiment of the present disclosure and a display panel according to an twelfth embodiment of the present disclosure will be described focused on the differences from the seventh to tenth embodiments.

The laminate panel according to the tenth embodiment of the present disclosure and the display panel according to the eleventh embodiment of the present disclosure differ in the configuration of the transparent colored layer 62. Specifically, the difference is in that the transparent colored layer 62 is colored with a black pigment and a toning pigment. The other configurations including the diffuse transmittance, haze, thickness, and total light transmittance of the transparent colored layer and the manufacturing method are the same as the laminate panel and the display panel according to the sixth to ninth embodiments.

The black pigment and the toning pigment are dispersed in the transparent resin, and thereby the transparent colored layer 62 is formed. For example, a black pigment having an average particle diameter of 50 to 180 nm can be used as the black pigment. If average particle diameter exceeds 180 nm, in such a case, when the black pigment is compounded into the transparent resin and becomes the transparent colored layer 62, the haze increases, and thus the display of the display panel may be distorted. Meanwhile, in a case where the average particle size is smaller than 50 nm, bluish black is obtained; therefore, color correction with the toning pigment is not necessary.

The black pigment having an average particle diameter of 50 to 180 nm is likely to absorb blue light and reflect red light, therefore having a strong reddish or yellowish tone of the chromaticity b* of 3 or greater. The toning pigment is used to correct the color of the black pigment having a strong reddish or yellowish tone and adjust the color to bluish black or neutral black, the chromaticity a* and the chromaticity b* of which are respectively 1 to −1 and 1 to −4. A pigment having an average particle diameter aligned with the black pigment can be used as the toning pigment, and at least one pigment having a freely selectable color, such as a blue pigment or yellow pigment can be used. Here, the "pigment having an average particle diameter aligned with black pigment" refers to a pigment having an average particle diameter that is from 0.8 to 1.2 times as large as the average particle diameter of the black pigment. In particular, the pigment preferably has the same average particle diameter that is 1.0 times as large as the average particle diameter of the black pigment. Meanwhile, in a case where a pigment having an average particle diameter exceeding a range from 0.8 to 1.2 times as large as that of the black pigment is used as the toning pigment, the pigments having different particle diameters are mixed in the transparent colored layer 62. Therefore, diffuse reflection occurs, which may cause the transparent colored layer 62 to appear cloudy. Additionally, the diffuse transmission of the incident light into the transparent colored layer 62 is increased by the blue pigment having a large particle diameter, and thus the haze may increase to 5% or higher. Accordingly, when applied as a display panel, the display is likely to be distorted.

At least one pigment having a freely selectable color can be used as the toning pigment. For example, a black pigment from 1 to 5 wt % to the entire weight of the transparent colored layer and having an average particle diameter of 150 nm, a blue pigment from 1 to 5 wt % to the entire weight of the transparent colored layer and having an average particle diameter of 150 nm, a red pigment from 1 to 5 wt % to the entire weight of the transparent colored layer and having an average particle diameter of 150 nm are applied, and thereby the transparent colored layer having a neutral black tone of the chromaticity a* of −1 and the chromaticity b* of −1 can be obtained. Here, the blue pigment is used to counteract a yellow tone derived from the black pigment having an average particle diameter of 150 nm. In addition, the red pigment is used to weaken green generated by mixing of yellow from the black pigment and blue from the blue pigment.

From the above, for the laminate panel and the display panel having the transparent colored layer as described above, color correction is made with the toning pigment aligned with the average particle diameter of the black pigment. Therefore, the laminate panel and the display panel having a bluish black or neutral black tone while preventing the increase in luminosity and haze is obtained.

Further, in each of the aforementioned embodiments of the present disclosure, a location including a central portion of the display panel is defined as the display region, and the non-display region obtained by forming the decorative layer on the four surrounding sides located adjacent to and around the display region is formed. Alternatively, depending on designs, the decorative layer is not limited to the four surrounding sides and may be formed on the specific one, two, or three sides. In addition, the decorative layer may be partially formed on the inside of the display region.

Furthermore, in each of the aforementioned embodiments of the present disclosure, after the decorative sheet is fixed to the base substrate, the base sheet and the release layer are peeled. Alternatively, the display panel including the base sheet may be formed without peeling the base sheet in view of workability or the like. In this case, the surface protection layer and the release layer need not to be provided. Further, in a case where the base sheet is not peeled, the total light transmittance from the base sheet to the base substrate, which is measured from the base sheet, is preferably from 40 to 90%. Furthermore, the surface roughness Ra of the base sheet, which is measured in accordance with JIS C2151 is preferably from 0.1 nm to 100 nm. In a case where the surface roughness Ra exceeds 100 nm, shading of the film thickness in the display region increase, and the total light transmittance is uneven, which may cause a problem in transparent display, in particular, on a large screen.

Additionally, in the fifth and sixth embodiments of the present disclosure, the size of the decorative sheet 70 is set to be smaller than that of the base substrate 60; however, in a case where the positional alignment of the base substrate 60 and the decorative sheet 70 can be easily performed, the decorative sheet 70 having the same size as the base substrate 60 may be used.

Example 1

An example of the laminate panel 10 according to the first embodiment will be described.

The release layer 72 made of a melamine resin of 1.0 µm and the surface protection layer 63 made of an acrylic resin of 5.0 µm are sequentially applied on the base sheet 71 by a coating method. Next, a polyvinyl resin in which carbon black is dispersed as a pigment is applied with a thickness of 5.0 µm on the surface protection layer 63 to form the smoke colored transparent colored layer 62 having a total light transmittance of 85%. Subsequently, the adhesive layer 67 of 10 µm and the high peeling strength release film 68 are laminated on the transparent colored layer 62 previously formed, and thereby the decorative sheet 70 is prepared. Next, the high peeling strength release film 68 of the decorative sheet 70 is peeled, and the surface of the adhesive layer 67 is laminated on the base substrate 60 and treated by autoclaving at 50° C. and at 5 atm for 30 minutes. Afterward, the base sheet 71 and the release layer 72 are peeled, and thus the laminate panel 10 in which the surface protection layer 63 and the transparent colored layer 62 are transferred via the adhesive layer 67 onto the base substrate 60 is obtained.

In another manufacturing method, the release layer 72 made of a melamine resin of 1.0 µm and the surface protection layer 63 made of an acrylic resin of 5.0 µm are sequentially applied on the base sheet 71 by a coating method. Next, a polyvinyl resin into which carbon black is dispersed as a pigment is applied with a thickness of 2.0 µm on the surface protection layer 63 to form the smoke colored transparent colored layer 62 having a total light transmittance of 85%, and thereby the decorative sheet 80 is prepared. Subsequently, the dam 90 having a rectangular frame shape of 10 µm is formed by screen printing on the base substrate 60 made of polycarbonate of 1.0 mm. Next, during the step of fixing the decorative sheet 80, the ultraviolet light curing resin 69 is discharged to the inside of the dam 90 by the amount such that the ultraviolet light curing resin 69 on the inside the dam 90 has a thickness of 20 µm. Subsequently, the surface of the transparent colored layer 62 of the decorative sheet 80 is pressed against the ultraviolet light curing resin 69, and the decorative sheet 80 is placed in a stationary manner so that the thickness of the ultraviolet light curing resin 69 on the inside of the dam 90 is 15 µm. At this time, the excess ultraviolet light curing resin 69 overflows to the outside of the dam 90, and the ultraviolet light curing resin 69 on the inside of the dam 90 has a uniform thickness. Next, the ultraviolet light curing resin 69 is irradiated with the ultraviolet light 95 and thereby is cured, and the decorative sheet 80 is fixed to the base substrate 60. Then, the base sheet 71 is peeled together with the release layer 72 so that the surface protection layer 63 is exposed, and thereby the surface protection layer 63 and the transparent colored layer 62 are transferred onto the base substrate 60. Subsequently, trimming is performed on the inside of the dam 90, and thereby the laminate panel 10 is obtained.

Example 2

An example of the display panel 20 according to the second embodiment will be described.

After manufacturing the display panel 10 according to the first embodiment, a polyvinyl resin into which carbon black is dispersed as a pigment is applied with a thickness of 5.0 µm by screen printing on a part of the surface protection layer 63, which is to be the non-display region 86, and thereby the decorative layer 64 having a total light transmittance of 5% is formed. Thus, the display panel 20 is obtained.

Example 3

An example of the laminate panel 30 according to the third embodiment will be described.

A glass sheet is used as the base substrate 60.

The glass plate is cut, polished, and pressed to prepare the rectangular base substrate 60 made of glass of 1.0 mm. Next, after punching the decorative sheet 70 into a rectangular shape having a long side and a short side that are smaller by 0.15 mm than the rectangular shape of the glass base substrate, the high peeling strength release film of the decorative sheet 70 is peeled, and the surface of the adhesive layer 67 is laminated on the base substrate 60 and treated by autoclaving at 50° C. and at 5 atm for 30 minutes. Afterward, the base sheet 71 and the release layer 72 are peeled, and thus the laminate panel 30 in which the surface protection layer 63 and the transparent colored layer 62 are transferred via the adhesive layer 67 onto the base substrate 60 is obtained.

Example 4

An example of the display panel 40 according to the fourth embodiment will be described.

After manufacturing the display panel 30 according to Example 3, a polyvinyl resin into which carbon black is dispersed as a pigment is applied with a thickness of 5.0 µm by screen printing on a part of the surface protection layer 63, which is to be the non-display region 86, and thereby the decorative layer 64 having a total light transmittance of 5% is formed. Thus, the display panel 40 is obtained.

BRIEF DESCRIPTION OF THE REFERENCE CHARACTERS

10 Laminate panel
20 Display panel
30 Laminate panel
40 Display panel
60 Base substrate
61 Adhesive layer
62 Transparent colored layer
63 Surface protection layer
64 Decorative layer
68 High peeling strength release film
69 Ultraviolet light curing resin
70 Decorative sheet
71 Base sheet
72 Release layer
80 Decorative sheet
85 Display region
86 Non-display region
90 Dam

The invention claimed is:
1. A decorative sheet comprising:
a base sheet; and
a transparent colored layer formed on the base sheet, the transparent colored layer including a transparent resin and a pigment or dye and having a diffuse transmittance from 0.2 to 1.13%, a haze from 0.1 to 3%, and a thickness from 0.5 to 20 µm, wherein a total light transmittance from the base sheet to the transparent colored layer, which is measured from the base sheet, is from 45 to 90%.

2. The decorative sheet according to claim 1, wherein the pigment is a black pigment having an average particle diameter from 1 to 30 nm.

3. The decorative sheet according to claim 1, wherein the pigment is a black pigment having an average particle diameter from 50 to 180 nm, and
the transparent colored layer further comprises a toning pigment having an average particle diameter that is from 0.8 to 1.2 times as large as the average particle diameter of the black pigment.

4. The decorative sheet according to claim 1, further comprising a surface protection layer between the base sheet and the transparent colored layer.

5. A method of manufacturing a laminate panel, the method comprising:
forming a high peeling strength release film via an adhesive layer on a surface of the transparent colored layer of the decorative sheet described in claim 1; and
peeling the high peeling strength release film, laminating a surface of the adhesive layer of the decorative sheet on the base substrate to fix the decorative sheet to the base substrate, and obtaining the laminate panel having a total light transmittance from 40 to 90% from the base sheet to the base substrate, which is measured from the base sheet.

6. A method of manufacturing a laminate panel, the method comprising:
preparing the decorative sheet described in claim 1;
forming a dam on a base substrate;
forming an adhesive layer on the dam; and
pressing a surface of the transparent colored layer of the decorative sheet against the adhesive layer to fix the decorative sheet to the base substrate, and obtaining the laminate panel having a total light transmittance from 40 to 90% from the base sheet to the base substrate, which is measured from the base sheet.

7. A method of manufacturing a laminate panel, the method comprising:
forming a high peeling strength release film via an adhesive layer on a surface of the transparent colored layer of the decorative sheet described in claim 4;
peeling the high peeling strength release film and laminating a surface of the adhesive layer of the decorative sheet on the base substrate to fix the decorative sheet to the base substrate; and
peeling the base sheet and obtaining the laminate panel having a total light transmittance from 40 to 90% from the surface protection layer to the base substrate, which is measured from the surface protection layer.

8. A method of manufacturing a laminate panel, the method comprising:
preparing the decorative sheet described in claim 4;
forming a dam on a base substrate;
forming an adhesive layer on the dam;
pressing a surface of the transparent colored layer of the decorative sheet against the adhesive layer to fix the decorative sheet to the base substrate; and peeling the base sheet and obtaining the laminate panel having a total light transmittance of 40 to 90% from the surface protection layer to the base substrate, which is measured from the surface protection layer.

9. A method of manufacturing a display panel, the method comprising:
preparing the laminate panel manufactured by the method described in claim 5; and
forming a decorative layer, which includes a transparent resin and a pigment, as a non-display region in a freely selectable location on the base sheet or the surface protection layer such that a total light transmittance in the non-display region, which is measured from the opposite side to the base substrate, is from 0 to 10% and that a color difference between the non-display region and a display region adjacent to the non-display region is from 0.1 to 1.0%.

10. A laminate panel comprising:
a base substrate; and
the decorative sheet described in claim 1, in which a surface of the transparent colored layer is laminated on the base substrate,
wherein a total light transmittance from the base sheet to the base substrate, which is measured from the base sheet, is from 40 to 90%.

11. A laminate panel comprising:
a base substrate; and
the decorative sheet described in claim 2, from which the base sheet is peeled and in which a surface of the transparent colored layer is laminated on the base substrate,
wherein a total light transmittance from the surface protection layer to the base substrate, which is measured from the surface protection layer is 40 to 90%.

12. The laminate panel according to claim 10, wherein the pigment is a black pigment having an average particle diameter from 1 to 30 nm.

13. The laminate panel according to claim 10, wherein the pigment is a black pigment having an average particle diameter from 50 to 180 nm, and
the transparent colored layer further comprises a toning pigment having an average particle diameter that is from 0.8 to 1.2 times as large as the average particle diameter of the black pigment.

14. The laminate panel according to claim 12, wherein the surface protection layer or the base sheet has a surface roughness from 0.1 nm to 100 nm, which is measured in accordance with JIS C2151.

15. A display panel comprising:
a decorative layer including a transparent resin and a pigment and formed as a non-display region in a freely selectable location on the base sheet or the surface protection layer of the laminate panel described in claim 10,
wherein a total light transmittance in the non-display region, which is measured from the decorative layer, is from 0 to 10%, and a color difference between the non-display region and a display region adjacent to the non-display region is from 0.1 to 1.0%.

16. A decorative sheet comprising:
a base sheet;
a release layer formed on the base sheet;
a surface protection layer formed on the release layer;
a transparent colored layer formed on the surface protection layer, the transparent colored layer including a transparent resin and a pigment and having a surface roughness from 0.1 nm to 100 nm, which is measured in accordance with JIS C2151;
an adhesive layer formed on the transparent colored layer; and
a high peeling strength release film formed on the adhesive layer, wherein a total light transmittance from the base sheet to the transparent colored layer is from 45 to 90%, and a peeling strength between the release layer and the surface protection layer is set to be greater than a peeling strength between the high peeling strength release film and the adhesive layer.

17. The decorative sheet according to claim 16, wherein the peeling strength between the release layer and the surface protection layer is from 0.15 to 0.50 N/25 mm, and the peeling strength between the high peeling strength release film and the adhesive layer is from 0.05 N to 0.30 N/25 mm.

18. A method of manufacturing a laminate panel, the method comprising:

preparing the decorative sheet described in claim 16;

peeling the high peeling strength release film and fixing a surface of the adhesive layer of the decorative sheet on a base substrate; and peeling the base sheet and the release layer from the decorative sheet and transferring the transparent colored layer and the surface protection layer onto the base substrate.

19. A method of manufacturing a display panel, the method comprising:

preparing the laminate panel manufactured by the method described in claim 18; and forming a decorative layer, which includes a transparent resin and a pigment, as a non-display region in a freely selectable location on the surface protection layer or the base sheet such that a total light transmittance in the non-display region, which is measured from the opposite side to the base substrate, is from 0 to 10% and that a color difference between the non-display region and a display region adjacent to the non-display region is from 0.1 to 1.0%.

* * * * *